United States Patent [19]

Jue

[11] Patent Number: 4,725,907
[45] Date of Patent: Feb. 16, 1988

[54] CARRIAGE LATCH FOR A DISC DRIVE INCORPORATING INERTIAL LOCK-UP

[75] Inventor: Clifford T. Jue, Santa Cruz, Calif.

[73] Assignee: Seagate Technology, Scotts Valley, Calif.

[21] Appl. No.: 931,959

[22] Filed: Nov. 24, 1986

Related U.S. Application Data

[63] Continuation of Ser. No. 662,613, Oct. 19, 1984, abandoned.

[51] Int. Cl.$^4$ .................. G11B 5/54; G11B 21/22; G11B 5/012
[52] U.S. Cl. ........................... 360/105; 360/86; 360/97
[58] Field of Search .............. 360/86, 97–99, 360/104–106, 137; 369/219, 221, 223, 257; 74/531; 188/67

[56] References Cited

U.S. PATENT DOCUMENTS

| | | | |
|---|---|---|---|
| 2,378,173 | 6/1945 | Bazley | 188/67 |
| 4,139,874 | 2/1979 | Shiraishi | 360/86 |
| 4,484,241 | 11/1984 | Brende et al. | 360/105 |
| 4,562,500 | 12/1985 | Bygdnes | 360/105 |

Primary Examiner—John H. Wolff
Assistant Examiner—Benjamin E. Urcia
Attorney, Agent, or Firm—Flehr, Hohbach, Test, Albritton & Herbert

[57] ABSTRACT

A dynamic latching mechanism for a disc drive includes a latch rotatable about a pivot which captures an extension on the carriage. The latch is mounted in a frame directly attached to the disc drive housing. A spring loaded plunger normally is biased against the latch to hold it in place and thus restrain the carriage after the extension has been captured and power removed. A solenoid withdraws the plunger and allows release of the carriage. A brake plate is provided sliding on the plunger. A protrusion which extends from the latch frame and thus the disc drive housing cooperates with an edge of the brake plate. In the event of sudden shock to the housing, the shock force is transmitted to the protrusion which tilts the brake plate, freezing the plunger against the latch and preventing the latch from releasing from the extension on the carriage, so that the carriage is properly restrained even in the event of a significant shock.

10 Claims, 6 Drawing Figures

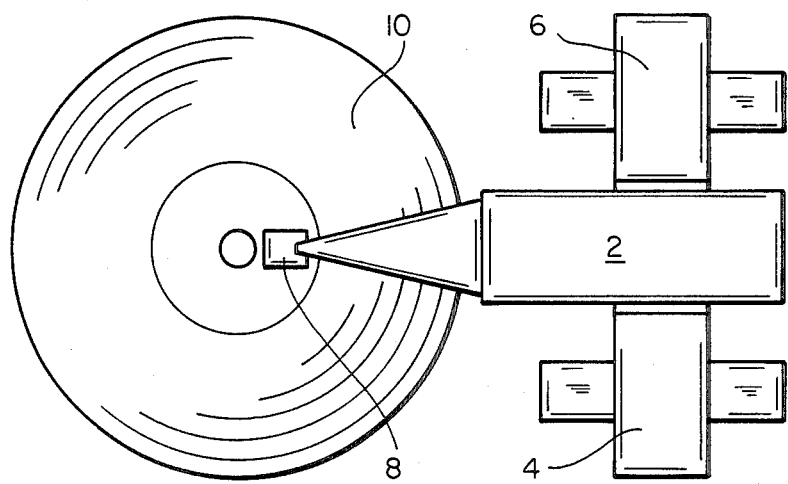
FIG_1
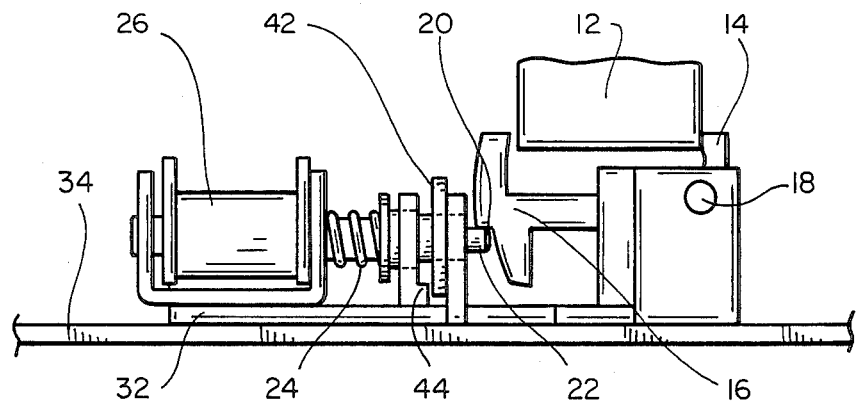
FIG_2

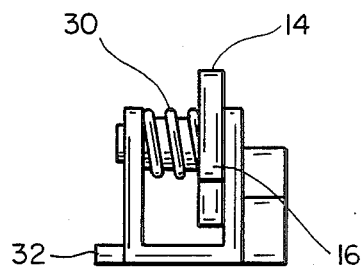
FIG_3
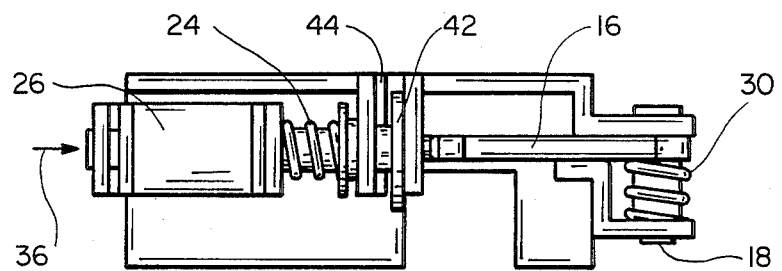
FIG_4
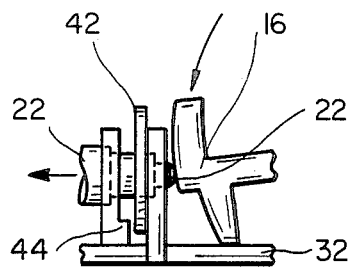
FIG_5
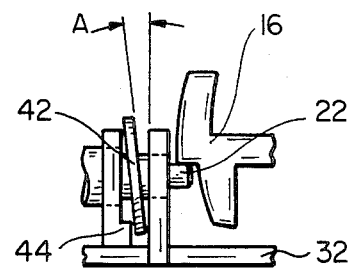
FIG_6

CARRIAGE LATCH FOR A DISC DRIVE INCORPORATING INERTIAL LOCK-UP

This is a continuation of application Ser. No. 662,613, filed Oct. 19, 1984 now abandoned.

This invention is directed generally to the field of disc drives and more particularly to a latch for selectively preventing movement of the carriage in a disc drive.

As is well known, disc drive machines store and retrieve data stored on concentric tracks recorded on discs coated with a magnetic medium. The tracks are written and read by magnetic heads or transducers which cooperate with the surface of the dics. These heads are secured to a carriage and moved from track to track by some form of motor. A typical unit or actuator for providing this head positioning function is described in U.S. Pat. No. 4,568,992.

In normal operation, a thin layer of air is formed between the transducer and the surface of the rapidly spinning disc. This air layer prevents physical contact between these two components, thereby allowing the transducer to be moved about without damage to itself or the disc surface. However, when power is removed from the system, the transducer and disc are in physical contact. Under these conditions, relative motion between the transducer and the disc must be restricted to prevent damage to one, the other or both.

Generally, in disc drive designs utilizing stepper motors, the motor itself restricts the motion of the transducer and there is no problem. A stepper motor has significant detent force when no power is being applied; thus the attached carriage is naturally restrained from undefined movement. However, with the advent of voice coil motor drives in a small systems environment, the problem of restraining the carriage from undefined movement has become serious.

In a typical voice coil motor drive, a coil or coils attached to the carriage is placed in the magnetic field produced by a magnet or magnets fixed to the base of the drive. The carriage is driven and held in position by the direction and amplitude of current applied to the coil; but when no current is applied, as is the case when power is moved from the system, the carriage is free to move due to its own inertia.

It is therefore an objective of the present invention to provide an improved mechanical latch for use in restraining the actuator in a disc drive.

Specifically, an object of the invention is to prevent carriage movement in a disc drive using a voice coil motor when power has been removed.

In the prior art, the carriage has been driven to a home position and mechanically latched in that position. However, a sufficiently large shock to the drive will release the carriage, because the solenoid typically used to release the carriage must inherently be compact and low powered and thus relatively weak. If a larger force is used in the restraint of the carriage, then a larger stronger solenoid will be needed to release it.

This problem has become even more significant with advent of portable computers wherein the disc drive is more frequently subjected to sudden shocks, and such shocks may occur while the drive is being carried at any angle.

Therefore, it is an objective of the present invention to provide a disc drive latch which can utilize a solenoid and spring of relatively limited force while providing significant restraining force against any sudden movement of the disc drive in response to a mechanical shock.

Further, since the major problem being addressed is holding the carriage in its home position in the face of sudden mechanical shock, it would be highly desirable if the latch were to function as a dynamically controlled latch, effectively raising the restraining force in response to the magnitude of the shock.

These and other objectives and advantages of the present invention are achieved by a dynamic latching mechanism. Incorporated in the mechanism is a latch rotatable about a pivot which captures an extension on the carriage. The latch is mounted in a frame directly attached to the disc drive housing. A spring loaded plunger normally is biased against the latch to hold it in place and thus restrain the carriage after the extension has been captured and power removed. A solenoid withdraws the plunger and allows release of the carriage. In the present invention, a brake plate is provided sliding on the plunger. A protrusion which extends from the latch frame and thus the disc drive housing cooperates with an edge of the brake plate. In the event of sudden shock to the housing, the shock force is transmitted to the protrusion which tilts the brake plate, freezing the plunger against the latch and preventing the latch from releasing from the extension on the carriage, so that the carriage is properly restrained even in the event of a significant shock.

The advantages and technical features of the present invention will become more apparent from a study of the following disclosure wherein:

FIG. 1 is a schematic drawing of a linear actuator mounted in a housing of a type in which this invention is useful;

FIG. 2 is a side view of the latch of this invention;

FIG. 3 is an end view of the latch shown in FIG. 2;

FIG. 4 is a top view of the latch shown in FIG. 2;

FIG. 5 is a schematic view of the operation of the latch and plunger; and,

FIG. 6 is a view of the locking position of the inertial brake as it occurs in response to a shock to the disc drive housing.

FIG. 1 shows a typical linear motor disc drive arrangement including carriage 2 driven by voice coil motor cores 4 and 6 to move a transducer head 8 from track to track relative to disc 10. When power is removed from the drive, the carriage is driven to a home position which is at the inner edge of the disc and not within the area on which data is being stored.

Referring to FIGS. 2 through 6, at this home position, the carriage extension 12 stikes the tab 14 which is on the back of the latch 16. As a result, the latch 16 itself rotates about the pivot 18 in a clockwise direction, capturing the carriage extension 12. As capture occurs, the plunger 22 propelled by the compression spring 24 engages recess 20 on the rear side of the latch 16 and prevents it from rotation counterclockwise so that the carriage remains captured.

In order to release the carriage, power is applied to the solenoid 26, retracting the plunger 22, and compressing the spring 24. This releases the latch 16 (as shown in FIG. 5) due to the biasing force of the latch release spring 30 shown in FIG. 4. This latch release spring 30 also appears in the end view of FIG. 3; the counterclockwise directed force of this spring 30 which is attached to the latch 16, will hold the latch 16 in the retracted position shown in FIG. 5 until the carriage extension 12 again strikes the tab 14, causing the latch 16 to rotate against this spring biasing force.

The special significance of this invention lies in its operation during the application of a shock load. It must be remembered that the latch frame 32 of the latch is directly connected to the housing 34 of the disc drive which is represented by the broken away wall portion 34 shown in FIG. 2.

The design of the brake plate which is the key element of the inertial brake of this invention is such that it will bind on the plunger 22 when the brake plate 42 and plunger 22 are at an angle A (FIG. 6) relative to one another.

In normal operation, as shown in FIG. 5, a step in the diameter of the plunger 22 (shown in dotted lines in FIG. 2) insures that the brake plate 42 remains perpendicular to the plunger 22 when the plunger is at rest. When the solenoid 26 is energized, the inertia of the brake plate 42 is sufficiently large in comparison to the frictional force between the plunger 22 and brake plate 42 that the perpendicular alignment is maintained while the plunger 22 is rapidly retracted. (See FIG. 5) The step in the plunger also appears clearly in dotted line form in FIG. 5; it is important to note that without this reduced cross section or step in the plunger 22 that the plunger 22 and brake plate may bind under normal operating conditions.

During the application of a shock load to the disc drive housing 34, the shock force is applied to the entire assembly via housing 34 and latch frame 32. If the shock load is applied from behind the solenoid 26 in the direction 36 shown the tendency is for both the latch frame 32 and solenoid 26 to accelerate, while the plunger 22 stays at rest. For small loads, the biasing spring 24 provides sufficient force to accelerate the plunger 22 at the same rate as the latch frame 32 and the solenoid 26. However, during large shock loads, the spring 24 provides insufficient force to overcome the inertia of the plunger 22; as a consequence, the plunger 22 begins to move relative to the latch frame 32 and solenoid 26, releasing the carriage from the lock.

In known locking systems, this has the same effect as the normal plunger retraction operation shown in FIG. 5, causing release of the carriage. However, due to the inertial brake shown in operation in FIG. 6, the latch frame 32 through a protrusion 44 in the latch frame 32 impacts the edge of the brake plate 42 and causes it to rotate or tilt, binding on the plunger 22. The force transmitted through the latch frame 32 and brake plate 42 to the plunger 22 is sufficient to accelerate the plunger 22 at the same rate and in the same direction as the latch frame 32, thereby halting relative motion between the two. In the absence of the brake plate 42 of the inertial brake of this invention, the application of a sufficiently large shock force can cause enough relative motion between latch frame 32 and plunger 22 to release the latch 16. The inertial braking system of the present invention allows the usage of a relatively weak return spring or bias spring 24 and in turn allows the use of a small, inexpensive, low powered solenoid 26, without the danger of unintended release of the carriage latch.

Modifications and improvements to the present invention may become apparent to a person of skill in the art who has studied the subject invention disclosure. Although all references in this discussion are to a disc drive incorporating a linear carriage, the present invention could easily be adapted to operate equally well on a rotary carriage disc drive. Therefore, the subject invention is to be limited only by the scope of the following claims.

What is claimed:

1. In a disc drive having at least one spinning disc supported within a housing and actuator means supported on the same housing for positioning a transducer in relationship to tracks on said disc for information transfer interaction with said tracks, said actuator including a carriage, support means for the transducer mounted on the carriage, and means coupling said carriage to a motor for movement of said carriage under control of said motor, said carriage including a portion cooperating with means for physically locking said carriage in a fixed position relative to said disc, and locking means being positioned beneath said carriage and including a solenoid and plunger mounted on said housing and extending parallel to a direction of travel of said carriage, said plunger having a first portion having a first diameter, said first portion ending in a circumferential step down to a second portion having a reduced diameter, and a latch rotatable about a pivot in a frame on said housing upon being struck by movement of said carriage to capture said extension, said plunger being normally biased against said latch to control release of said latch and thereby said carriage, signal responsive means comprising a solenoid for overcoming said normal bias and retracting said plunger from a first position adjacent a recess in said latch whereby said carriage is captured by said latch to a second position withdrawn from said latch whereby said carriage is released by said latch and inertial brake means comprising a brake plate mounted on and slidable over said reduced diameter portion of said plunger and a frame portion mounted on said housing including a protrusion adjacent an edge of said brake plate and movable with said housing to tilt said brake plate at an angle relative to said plunger and activate said inertial braking action in response to a shock applied to said housing and thereby said frame, binding said plunger against unintended movement and thereby preventing unintended release of said carriage by said locking means.

2. A disc drive as in claim 1 wherein said latch includes a tab protruding into the path of said carriage extension and responsive to contact with said carriage extension to cause rotation of said latch about said pivot and capture of said carriage.

3. A disc drive as claimed in claim 2 including a spring mounted coaxially with said pivot for biasing said latch against movement in the direction of capture, activation of said signal responsive means allowing movement of said latch away from said carriage.

4. A disc drive as in claim 1 including a spring mounted coaxially with said pivot for biasing said latch against movement in the direction of capture, activation of said signal responsive means allowing rotation of said latch away from said capture position for said carriage extension.

5. A disc drive as in claim 1 wherein said brake plate rests on said reduced diameter portion of said plunger adjacent to said step down from said first diameter portion, said brake plate remaining perpendicular to the path of travel of the plunger and sliding on said plunger in response to normal activation of said solenoid.

6. A disc drive as in claim 1 wherein said locking means are mounted in a frame on said housing and include a first spring mounted coaxially with said plunger for holding said plunger in said first position and thereby holding said locking means in a locked position capturing said carriage, said solenoid overcoming said first spring and moving said plunger from said first position to said second position, said locking means including a second spring for normally biasing said latch away from said carriage, whereby activation of said solenoid releases said carriage.

7. In an actuator having a frame and a transducer carriage for positioning a transducer with respect to a recording medium, said carriage being movable along a linear path toward and away from said recording medium, a dynamic carriage lock for locking said carriage in a fixed position relative to said medium including a locking mechanism positioned beneath said carriage and including a solenoid and plunger mounted on said frame and extending parallel to the direction of travel of said carriage, said locking mechanism cooperating with latch means for capturing said carriage in said fixed position, said latch means comprising a latch rotatable about a pivot on said frame in response to being struck by an extension on said carriage to a position to capture said carriage, said plunger normally holding said latch means to retain said latch in said capture position to hold said carriage in said fixed position, said plunger being retracted by normal activation of said solenoid to release said latch means and thereby said carriage, said plunger including a first portion having a first diameter, said first portion ending in a circumferential step down to a second portion having a reduced diameter, and means for increasing the locking force of said plunger on said latch in response to a shock to said frame comprising a brake plate resting on a reduced diameter portion of said plunger, said brake plate remaining perpendicular to the path of travel of the plunger and sliding on said plunger in response to normal activation of said solenoid, said frame having a protrusion cooperating with an edge of said brake plate, said protrusion moving with said frame in response to a shock to said frame to tilt and bind said brake plate on said plunger and prevent movement of said plunger relative to said latch.

8. A carriage as claimed in claim 7 including a spring mounted coaxially with said pivot for biasing said latch against movement in the direction of capture, activation of said signal response means allowing movement of said latch away from said carriage.

9. A carriage lock as claimed in claim 8 wherein said carriage latch recess has said tab at one end thereof and a partially extended head portion at the other end thereof, said plunger cooperating with said partially extended head portion when said carriage is not in said locked position to retain said latch.

10. A carriage as claimed in claim 7 for cooperative engagement with an extension on said disc drive carriage, said latching means comprising said lock including a frame carried by the housing,
a latch rotatable about a pivot on the frame, said latch having a recess for capturing said carriage extension and a tab cooperating with said carriage to cause rotation of said latch, and
said plunger capturing said latch in a locking position.

* * * * *